United States Patent [19]

Gomi

[11] Patent Number: 4,801,158
[45] Date of Patent: Jan. 31, 1989

[54] PIPE JOINT

[75] Inventor: Chikashi Gomi, Yamanashi, Japan

[73] Assignee: Kitz Corporation, Tokyo, Japan

[21] Appl. No.: 110,970

[22] Filed: Oct. 20, 1987

[30] Foreign Application Priority Data

| Oct. 31, 1986 | [JP] | Japan | 61-168032 |
| Oct. 31, 1986 | [JP] | Japan | 61-168033 |
| Oct. 31, 1986 | [KP] | D.P.R. of Korea | 61-168031 |
| Jan. 9, 1987 | [JP] | Japan | 62-1032 |
| Jan. 9, 1987 | [JP] | Japan | 62-1033 |

[51] Int. Cl.$^4$ ............................................. F16L 11/12
[52] U.S. Cl. ........................................ 285/52; 285/55; 285/330; 285/353; 285/354; 285/903
[58] Field of Search ............... 285/55, 52, 906, 330, 285/903, 382.7, 353, 354

[56] References Cited

U.S. PATENT DOCUMENTS

| 1,574,052 | 2/1926 | Mueller | 285/330 X |
| 2,477,969 | 8/1949 | Donner | 285/330 X |
| 3,507,171 | 3/1970 | Baron | 285/52 |
| 3,643,984 | 2/1972 | Bucceri | 285/382.7 X |
| 3,967,839 | 7/1976 | Dunmire | 285/330 X |
| 4,437,691 | 3/1984 | Laney | 285/903 X |
| 4,630,850 | 12/1986 | Saka | 285/910 |
| 4,674,775 | 6/1987 | Tajimu | 285/903 X |

FOREIGN PATENT DOCUMENTS 51-44174 10/1976 Japan ........................... 285/903

Primary Examiner—Dave W. Arola
Attorney, Agent, or Firm—Bruce L. Adams; Van C. Wilks

[57] ABSTRACT

A pipe joint includes a joint body having an internal thread portion formed in the interior thereof, a bush having formed on the outer periphery thereof an external thread portion helically meshed with the internal thread portion of the joint body, a gasket accommodated within the interior of the joint body, and a retainer having formed on one end thereof on the side of the joint body a flange of increased wall thickness which is pushed toward the joint body by the end face of the external thread portion of the bush. The flange of the retainer may be provided with at least one engaging projection extending radially outwardly from the outer periphery thereof and, in this case, the internal thread portion of the joint body is provided therein with at least one lock portion which is engaged with the at least one engaging projection of the flange.

11 Claims, 5 Drawing Sheets

PIPE JOINT

BACKGROUND OF THE INVENTION AND RELATED ART STATEMENT

The present invention relates to a pipe joint for flexible pipes used in the arrangement of gas pipes, water pipes, etc.

There have heretofore been proposed various pipe joints of this kind, such as in Japanese Patent Public Disclosure No. 60-73193, for example. A typical one is shown in FIG. 1. The illustrated prior art pipe joint comprises a joint body 1 provided on one side thereof with a cylindrical portion 5 having an external thread formed on the outer periphery thereof and also provided in the interior thereof with a pipe receiving wall 1a, a cap nut 2 having an internal thread 6 formed in the inner periphery thereof for helically meshing with the male thread on the cylindrical portion 5 of the joint body 1 and also having a proximal end 2a, a retainer 3 provided in the interior thereof with a corrugated portion 7 engageable with the peripheral corrugation of a flexible pipe 9, also provided on one end thereof with a flange 8 of increased wall thickness and adapted to be inserted into the cylindrical portion 5 of the joint body 1, and gasket 4 interposed between the other end of the retainer 3 and the pipe receiving wall 1a of the joint body 1.

The flexible pipe 9 is joined to the pipe joint of the aforementioned construction by the following procedures. The cap nut is inserted about the pipe 9 and, at the same time, the retainer 3 is also inserted about the pipe 9 so that an end face 9a of the pipe 9 projects slightly from the aforementioned other end of the retainer 3 and that the corrugated portion 7 of the retainer 3 is engaged with the peripheral corrugation of the pipe 9. Meanwhile, the gasket 4 is disposed on the pipe receiving wall 1a of the joint body 1. In this state, the internal thread 6 of the cap nut 2 is meshed helically with the external thread on the cylindrical portion 5 of the joint body 1 and then the cap nut 2 is rotated in a predetermined direction until the proximal end 2a of the cap nut 2 collides against the increased wall flange 8 of the retainer 3. Subsequently, the cap nut 2 is further rotated in the same direction by the use of a tool (not shown) to cause the poximal end 2a of the cap nut 2 to push the flange 8 of the retainer 3 toward the pipe receiving wall 1a of the joint body 1. At this time, the flexible pipe 9 engaged with the retainer 3 is also pushed in the same direction. As a result, the projecting end face 9a of the pipe 9 is compressed and tightly clamped between the retainer 3 and the gasket 4, thus joining the pipe 9 to the joint body 1.

In the prior art pipe joint, however, the pushing of the flange 8 of the retainer 3 by the proximal end 2a of the cap nut 2 produces deformation such as distortion etc. on the portion of the retainer 3 other than the increased wall flange 8 and consequently increases frictional resistance between the corrugated portion 7 of the retainer 3 and the peripheral corrugation of the pipe 9 and between the flange 8 of the retainer 3 and the proximal end 2a of the cap nut 2. As a result, the retainer 3 and the pipe 9 kept in engagement with each other are given rotation by rotating the cap nut 2 and are rotated in conjunction with the cap nut 2. Therefore, more rotation of the cap nut 2 than is necessary causes the projecting end face 9a of the pipe 9 rotated in conjunction with the cap nut 2 to twist the gasket 4, thereby lowering the sealing effect of the pipe joint.

Further, since the retainer 3 and the gasket 4 of the prior art pipe joint are made of a conductive material, when the pipe joint is used for pipes buried in the earth, there gives rise to galvanic corrosion and, when the pipe joint is used for such underground pipes in the vicinity of where a railway runs, there gives rise to stray current corrosion. This considerably shortens the service life of the underground pipes and that of the pipe joint.

OBJECTS AND SUMMARY OF THE INVENTION

One object of the present inventon is to provide a pipe joint exhibiting high sealing effect without deforming a retainer.

Another object of the present invention is to provide a pipe joint capable of preventing either galvanic corrosion or stray current corrosion.

Still another object of the present invention is to provide a pipe joint capable of preventing rotation of a retainer and a flexible pipe from being caused in conjunction with the rotation of a cap nut.

To attain the objects described above, according to the present invention, there is provided a pipe joint comprising a joint body forming an internal thread portion in the interior thereof, a bush forming on the outer periphery thereof an external thread portion helicallly meshed with the internal thread portion of the joint body, a gasket accommodated within the joint body, and a retainer forming on one end thereof on the side of the joint body, a flange of increased wall thickness which is pushed toward the joint body by the end face of the external thread portion of the bush.

Further, the present invention includes a pipe joint in which the flange of the retainer is provided with at least one engaging projection extending radially outwardly from the outer periphery thereof, whereas the internal thread portion of the joint body is provided therein with at least one lock portion which is engaged with the at least one engaging projection of the flange.

According to the present invention, there is also provided a pipe joint comprising a joint body provided on the outer periphery thereof with an external thread portion and on the inner periphery thereof with at least one engaging projection extending radially inwardly, a cap nut forming in the inner periphery thereof with an internal thread portion helically meshed with the external thread portion of the joint body a gasket accommodated within the joint body, and a retainer forming on one end thereof on the side of the cap nut a flange of increased wall thickness and having at least one lock portion engaged with the at least one engaging projection of the joint body.

Furthermore, the present invention includes a pipe joint in which both the retainer and the gasket are made of an electric insulation material.

The above and other objects, characteristic features and advantages of the present invention will become more apparent to those skilled in the art as the disclosure is made in the following description of preferred embodiments of the invention, as illustrated in the accompanying drawings.

DETAILED DESCRIPTION OF THE PREFERRED EMBODIMENTS

The present invention will now be described in detail with reference to the illustrated embodiments.

Figure 2:
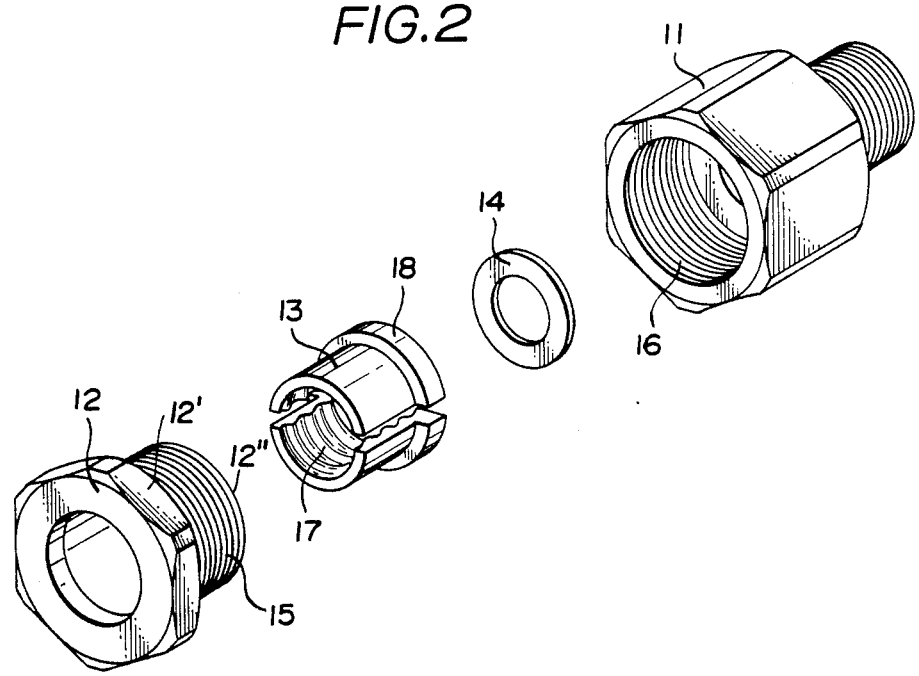
FIG. 2 is an exploded perspective view illustrating one embodiment of the pipe joint according to the present invention.
Figure 3:
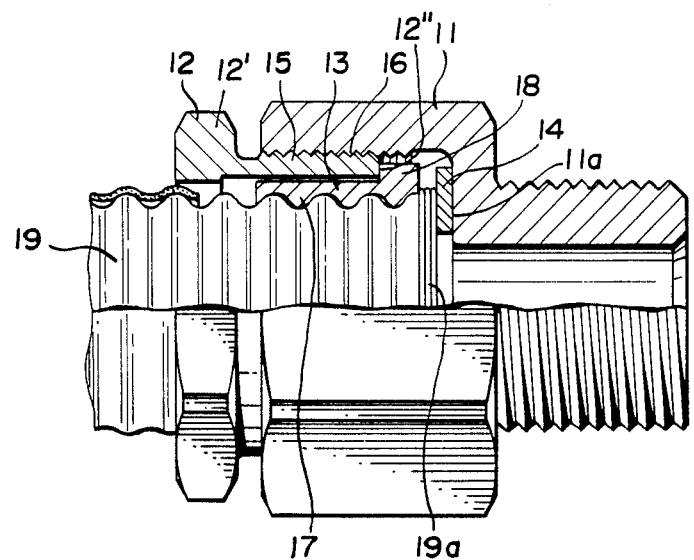
FIG. 3 is a partially sectioned explanatory view illustrating the pipe joint of FIG. 2 having a flexible pipe joined thereto.

FIGS. 2 and 3 illustrate one embodiment of the pipe joint according to the present invention. The pipe joint in this embodiment comprises a joint body 11, a bush 12, a retainer 13 and a gasket 14. The joint body 11 forms an internal thread portion 16 in the inner periphery thereof and has a pipe receiving wall 11a formed on the bottom of the interior thereof. The bush 12 has a pressure application end face 12" formed on one end thereof and a nut portion 12' formed on the other endthereof, and forms an external thread portion 15 on the outer periphery thereof, which is helically meshed with the internal thread portion 16 of the joint body 11. The retainer 13 is of a split type, is axially divided into two segments, and has a flange 18 of increased wall thickness formed on one end thereof. The flange 18 has an outside diameter smaller than the inside diameter of the internal thread portion 16 of the joint body 11 and larger than the inside diameter of the external thread portion 15 of the bush 12. The portion of the retainer 13 other than the flange 13 has an outside diameter smaller than the inside diameter of the external thread portion 15 of the bush 12. The retainer 13 has a corrugated portion 17 formed in the inner periphery over the entire length thereof so that the corrugated portion 17 engages with the peripheral corrugation of a flexible pipe 19. The gasket 14 has an outside diameter substantially the same as the outside diameter of the flange 18 of the retainer 13. As shown in FIG. 2, the joint body 11, bush 12 and retainer 13 are formed as a whole in a cylindrical shape, and the flange 18 of the retainer and gasket 14 are formed in an annular shape.

The flexible pipe 19 is joined to the pipe joint of the aforementioned construction by the following procedures. The bush 12 is inserted about one end portion of the pipe 9 and, at the same time, the retainer 13 with the flange 18 directed to the joint body 11 is also inserted about the one end portion of the pipe 9 so that the end face 19a of the pipe 19 projects slightly from one end of the flange 18, thereby engaging the inside corrugated portion 17 of the retainer 13 with the peripheral corrugation of the pipe 19. In this state, both the bush 12 and the retainer 13 having been inserted about the one end portion of the pipe 19 are guided to the internal thread portion 16 of the joint body 11, with the gakset 14 interposed between the projecting end face 19a of the pipe 19 and the pipe receiving wall 11a of the joint body 11. Then, the bush 12 is rotated in a predetermined direction while the external thread portion 15 of the bush 12 is helically meshed with the internal thread portion 16 of the joint body 11. As the rotation of the bush 12 proceeds, the pressure application end face 12" of the external thread portion 15 of the bush 12 pushes the other end face of the flange 18 to urge the retainer 13 little by little toward the pipe receiving wall 11a of the joint body 11. When the manual rotation of the bush 12 has become impossible, the bush 12 is further rotated in the same direction by the use of a tool (not shown). As a result, the end face 19a of the pipe 19 is compressed between the one end face of the flange 18 of the retainer 13 and the gasket 14 to obtain a high sealing effect. This state is illustrated in FIG. 3.

As is clear from FIG. 3, the external thread portion 15 of the bush 12 pushes the flange 18 of the retainer without exerting pressure load directly onto the main body of the retainer 13 and, therefore, there is no fear of the main body of the retainer 13 being deformed. Even though frictional resistance is generated on the interfaces between the inner periphery of the retainer 13 and the outer periphery of the flexible pipe 19, between the outer periphery of the retainer 13 and the inner wall of the external thread portion 15 and between the outer periphery of the flange 18 and the internal thread portion 16, the total frictional resistance is not more than the sum of the frictional resistance generated on the interface between the joint body 11 and the gasket 14 and that generated on the interfce between the gasket 14 and the flexible pipe 19. For this reason, the frictional resistance between the retainer 13 and the external thread portion 15 and between the retainer 13 and the flexible pipe 19 is not increased. Therefore, the flexible pipe 19 engaged with the retainer 13 is not rotated in conjunction with the rotation of the bush 12.

In order to suppress the frictional resistance between the retainer 13 and the external thread portion 15 as low as possible, the retainer 13 may be coated with a low-friction material, such as Teflon, for example.

Figure 4:
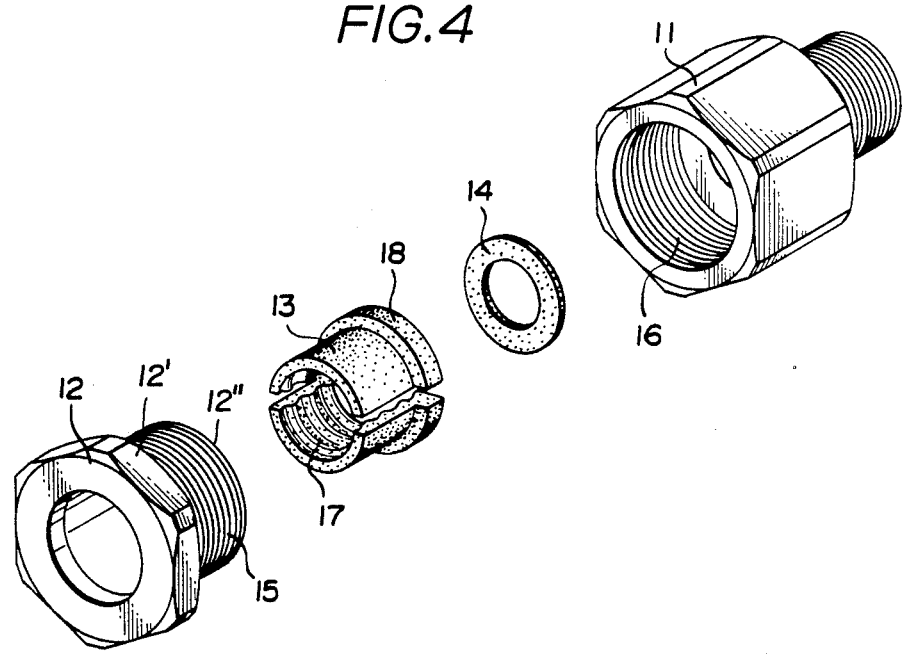
FIG. 4 is an exploded perspective view illustrating a modification of the pipe joint shown in FIG. 2.

Taking into consideration the use of the pipe joint for underground pipes, particularly for pipes buried in the earth on which a railway runs, both the retainer 13 and the gasket 14 may be made of an electric insulation material as shown in FIG. 4, whereby either galvanic corrosion or stray current corrosion of the underground pipes can be effectively prevented to insure prolonged service life of not only the underground pipes but also the pipe joints.

Figure 5:
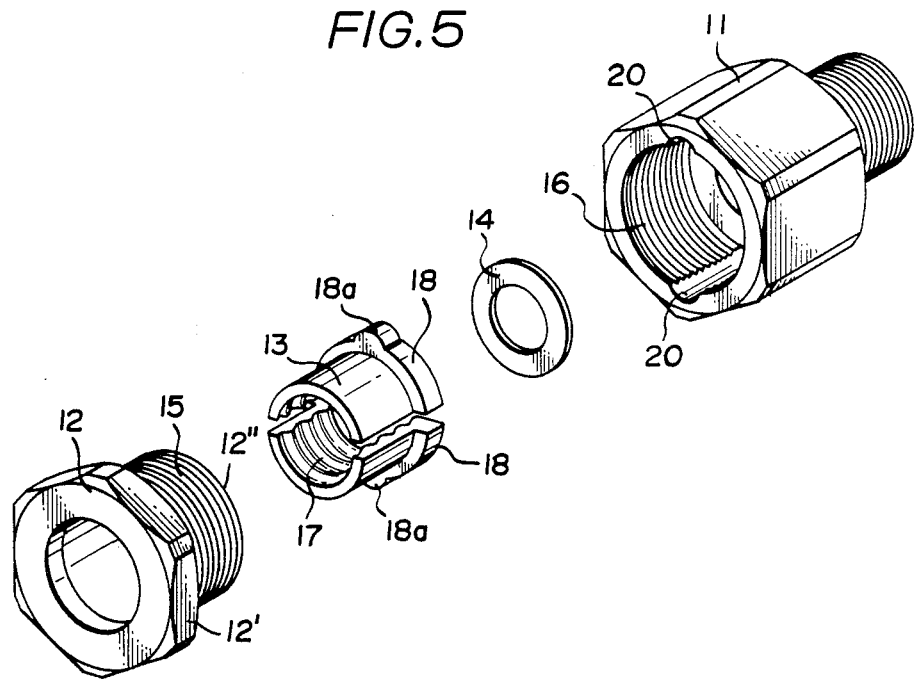
FIG. 5 is an exploded perspective view illustrating another embodiment of the pipe joint according to the present invention.
Figure 6:
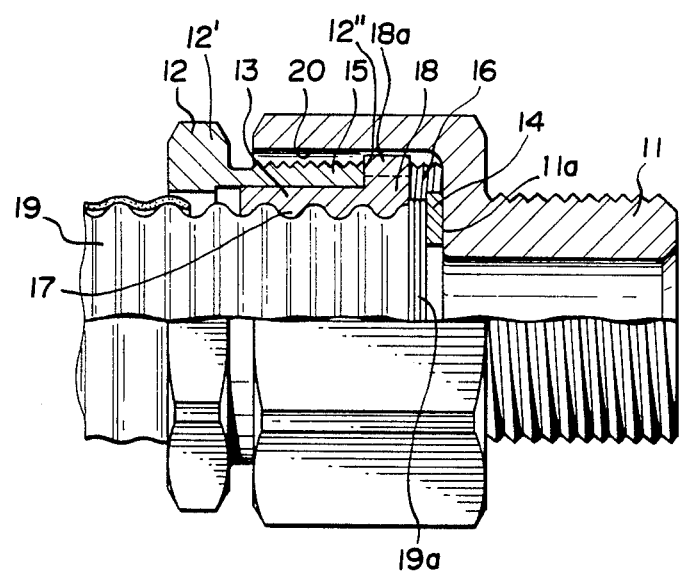
FIG. 6 is a partially sectioned explanatory view illustrating the pipe joint of FIG. 5 having a flexible pipe joined thereto.

FIGS. 5 and 6 illustrate another embodiment of the pipe joint according to the present invention. In this embodiment, the flange 18 of the retainer 13 is provided with a pair of opposed engaging projections 18a extending radially outwardly from the peripheral surface thereof, and the internal thread portion 16 of the joint body 11 is provided therein with a pair of opposed lock grooves 20 at positions corresponding to the positions of the engaging projections 18a so that the engaging projections 18a are locked in the lock grooves 20, whereby both the retainer 13 and the flexible pipe 19 are prevented with exactitude from being rotated in conjunction with the rotation of the bush 12. The same elements as those in the embodiment of FIG. 2 are indicated by the same reference numerals as used in FIG. 2, and description thereof is omitted.

It goes without saying that the pipe joint in this embodiment can provide the same effects as those obtained by the embodiment shown in FIG. 2. In addition thereto, since the engaging projections 18a can be locked in the lock grooves 20 with exactitude, in disregard of frictional resistance, both the retainer 13 and the flexible pipe 19 can be reliably prevented from being rotated in conjunction with the rotation of the bush 12.

Figure 1:
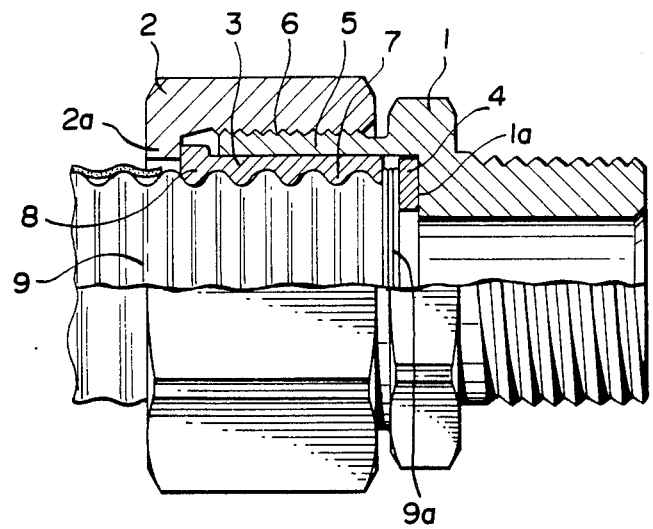
FIG. 1 is a partially sectioned explanatory view illustrating a prior art pipe having a flexible pipe joined thereto.
Figure 7:
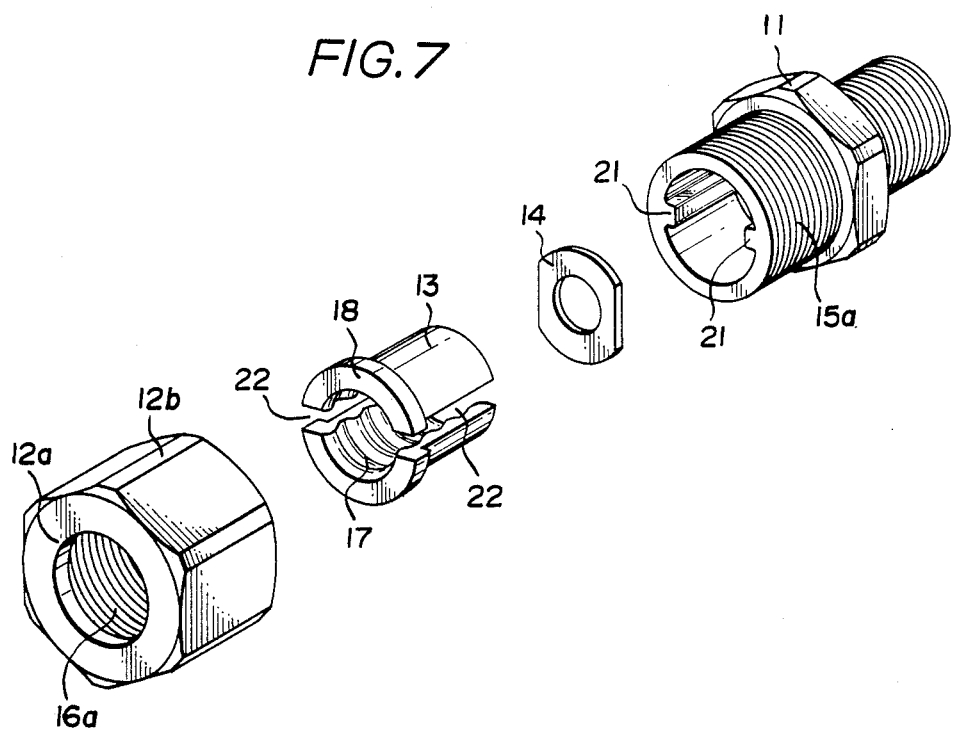
FIG. 7 is an exploded perspective view illustrating still another embodiment of the pipe joint according to the present invention.
Figure 8:
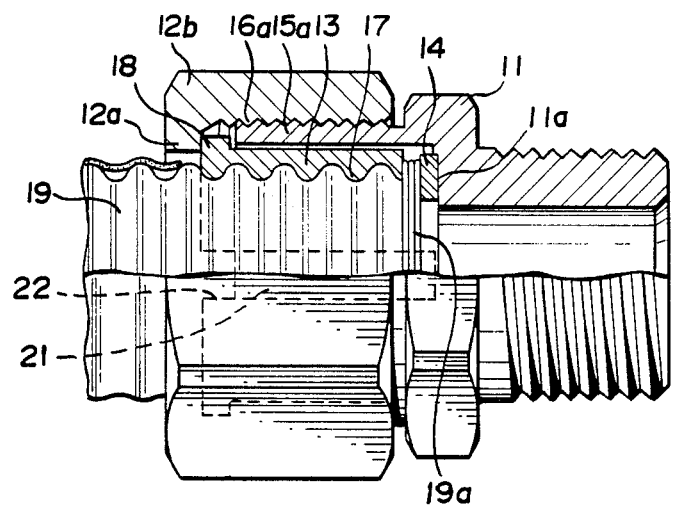
FIG. 8 is a partially sectioned explanatory view illustrating the pipe joint of FIG. 7 having a flexible pipe joined thereto.

When considering the prevention only of the retainer 13 and flexible pipe 19 from rotation in conjunction with the rotation of the member to be rotated, engaging projections 21 and lock grooves 22 may be added as illustrated in FIGS. 7 and 8, to the construction of the prior art pipe joint shown in FIG. 1. To be specific, the pipe joint in still another embodiment of the present invention illustrated in FIGS. 7 and 8 comprises a joint body 11 forming an external thread portion 15a on the outer periphery thereof and on the inner periphery thereof a pair of opposed engaging projections 21 extending radially inwardly, a cap nut 12 having a proximal end 12a and forming in the inner periphery thereof an internal thread portion 16a which is helically meshed with the external thread portion 15a of the joint body 11, a gasket 14 accommodated within the interior of the joint body 11, and a retainer 13 having a flange 18 formed on one end thereof on the side of the cap nut 12b and also having a pair of opposed lock grooves 22 formed therein so that the engaging projections 21 are locked in the lock grooves 22. In this embodiment, a flexible pipe 19 can be joined to the pipe joint in the same manner as in the prior art shown in FIG. 1. However, in this embodiment, since the engaging projections 21 can be locked in the lock grooves 22 with exactitude, the retainer 13 and flexible pipe 19 engaged with each other can be prevented from being rotated in conjunction with the rotation of the cap nut 12b.

Figure 9:
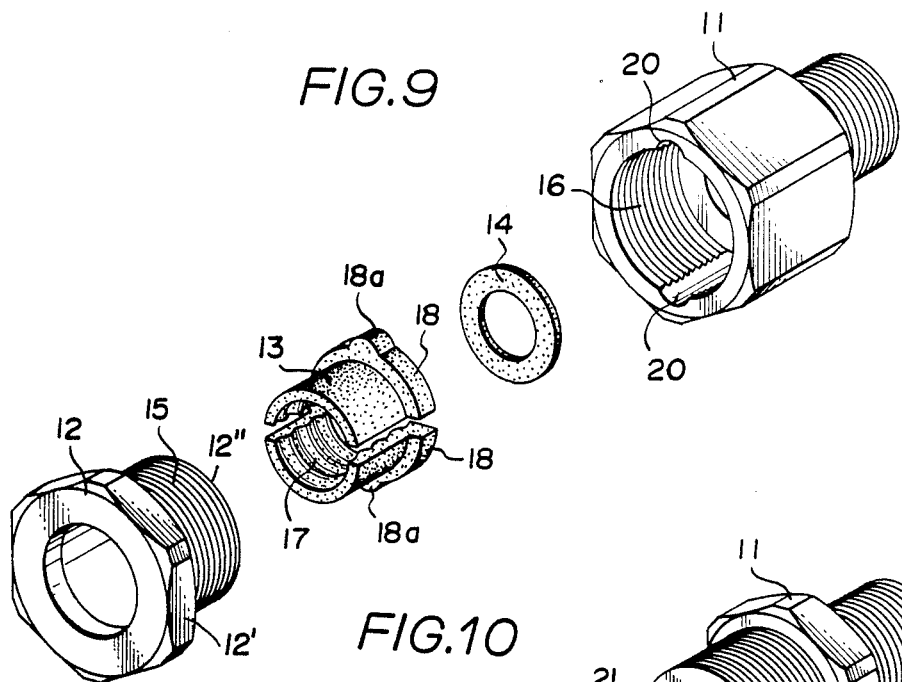
FIG. 9 is an exploded perspective view illustrating a modification of the pipe joint shown in FIG. 5.
Figure 10:
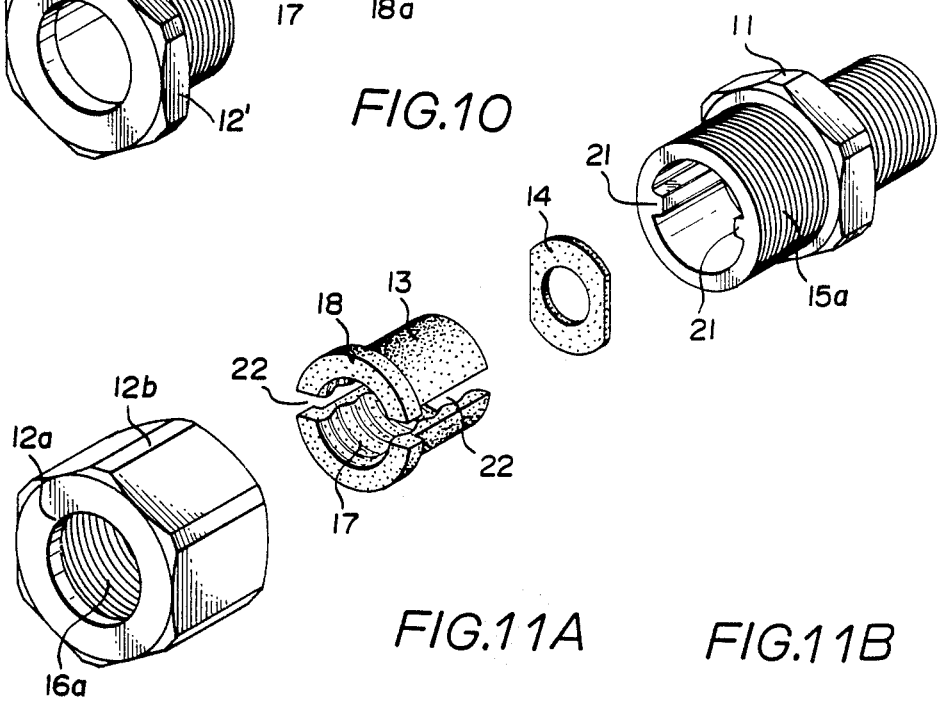
FIG. 10 is an exploded perspective view illustrating a modification of the pipe joint shown in FIG. 7.

In order to prevent galvanic corrosion or stray current corrosion, the retainers 13 and gaskets 14 of the embodiments shown in FIGS. 5 and 7 may be made of an electric insulation material such as synthetic resin or ceramics as illustrated as modifications thereof in FIGS. 9 and 10, respectively, similarly to those shown in FIG. 4 as the modification of the embodiment shown in FIG. 2.

In the embodiments shown in FIGS. 5 and 7, there are provided a pair of engaging projections 18a and 21 and a pair of lock portions 20 and 22. However, this is by no means limitative insofar as rotation of the retainer 13 and pipe 19 can be prevented when the bush 12 or cap nut 12b is rotated. At least one engaging projection and at least one lock portion will suffice.

Figure 11A:
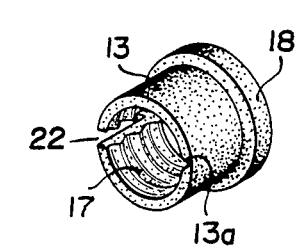
FIGS. 11A and 11B are perspective views illustrating retainers usable in the present invention.
Figure 11B:
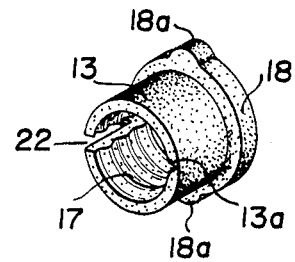

In any of the aforementioned embodiments and modifications, there is adopted a retainer of a split type divided axially into two segments. This is by no means limitative. For example, the two segments of the retainer may be joined together via a thin hinge 13a as illustrated in FIGS. 11A and 11B. In this case, the retainer is very convenient in the transportation and storage thereof and can advantageously be used in inserting a flexible pipe therein.

In the embodiment of FIG. 5, the engaging projection is provided on the retainer and the lock portion is formed in the joint body. However, the engaging projection may be provided on the joint body and the lock portion may be formed in the retainer. Similarly, in the embodiment of FIG. 7, the engaging projection provided on the joint body may be provided on the retainer and the lock portion formed in the retainer may be formed in the joint body.

As has been described in the foregoing, according to the present invention, since pressure load is exerted not onto the main body of the retainer but onto the flange of the retainer, it is possible to join a flexible pipe to the pipe joint without deforming the retainer and, therefore, it is also possible to prevent the retainer and flexible pipe from being rotated in conjunction with the rotation of the bush and to manifest high sealing effect. Further, according to the present invention, utilization of the engagement between the engaging projection and the lock portion makes it possible to reliably prevent the retainer and flexible pipe from being rotated in conjunction with the rotation of the bush or cap nut, and the retainer and gasket made of an electric insulation material can effectively prevent galvanic corrosion and stray current corrosion of the flexible pipes.

What is claimed is:

1. A pipe joint comprising in combination:
   a joint body having an internal thread portion formed in an axial interior portion thereof and a radially extending pipe receiving wall formed at one end of the axial interior portion, said internal thread portion having at least one lock groove formed therein,
   a bush having a pressure application end face formed on one end thereof and a nut portion formed on the other end portion thereof, and also having formed on an outer periphery thereof an external thread portion which is helically engageable with said internal thread portion of said joint body,
   a ring-shaped gasket composed of an electric insulating material and accommodated within the interior of said joint body with one surface thereof abutted against said pipe receiving wall of said joint body,
   a retainer composed of an electric insulation material comprising two axial segments jointed together with a thin hinge, said retainer having a flange of increased wall thickness relative to the remainder of the retainer formed on one end thereof and a corrugated portion formed in an inner periphery thereof, and a portion thereof other than said flange having an outside diameter smaller than the inside diameter of said external thread portion of said bush,
   wherein said corrugated portion of said retainer is engageable with a peripheral corrugation of a pipe, and
   wherein said flange has an outside diameter smaller than the inside diameter of said internal thread portion of said joint body and larger than the inside diameter of said external thread portion of said bush, and has at least one engaging projection which extends radially outwardly from the peripheral surface thereof and is locked in said at least one lock groove of said internal thread portion of said joint body, is placed towards said joint body when inserted into said joint body, and is pushed by said pressure application end face of said bush.

2. The pipe joint according to claim 1, wherein said retainer is coated with a low-friction material.

3. A pipe joint comprising in combination:
a joint body having an external thread portion formed on an outer periphery thereof terminating in an end face, an engaging projection formed on an inner periphery thereof so as to extend radially inwardly, and an interior pipe receiving wall formed at one end of the thread portion,
a cap nut having an internal thread portion in an inner periphery thereof which is helically meshed with said external thread portion of said joint body,
a ring-shaped gasket composed of electric insulating material, and having a cutout portion not interfering with said engaging projection of said joint body, and accommodated within said joint body with one surface thereof abutted against said pipe receiving wall of said joint body, and
a retainer composed of electric insulating material and comprising two axial segments joined together with a thin hinge to define a lock groove between said two segments, in which said engaging projection of said joint body is locked, said retainer having a corrugated portion formed in an inner periphery thereof for engaging with a peripheral corrugation of a pipe and a flange formed on one end thereof,
wherein said flange is placed facing said cap nut when inserted into said cap nut, and bears aganst said end face at the other end of said external thread portion of said joint body.

4. The pipe joint according to claim 3, wherein said retainer is coated with a low-friction material.

5. A pipe joint comprising:
a joint body comprising a first cylindrical portion having an internal thread and a radially inwardly extending pipe engaging wall at an internal end thereof;
a bush comprising a hollow cylindrical portion having an external thread, a radial pressure application end face at one end and a nut portion at the other end;
a retainer having a cylindrical body slidably receivable in the bush and comprising two axial segments and means hingedly joining the segments, wherein the segments have a corrugated interior surface for engaging a pipe, a radially outwardly extending flange at one end of the cylindrical body for engaging the pressure application end face and slidably receivable in the joint body;
a sealing gasket disposed between the flange and the pipe engaging wall;
and means disposed on the retainer and the joint body for engagement when the retainer is received in the joint body to prevent rotation of the retainer relative to the joint body.

6. The pipe joint according to claim 5, wherein said means for engagement includes said flange being provided with at least one engaging projection extending radially outwardly from the outer periphery thereof, and said internal thread portion of said joint body being formed therein with at least one lock groove for engaging therein said at least one engaging projection.

7. The pipe joint according to claim 5, wherein said retainer is coated with a low-friction material.

8. The pipe joint according to claim 5, wherein said retainer and said gasket are made of an electric insulating material.

9. A pipe joint comprising:
a joint body comprising a hollow first cylindrical portion having an external thread and a radially inwardly extending pipe engaging wall at an internal end thereof and an end face at the other end thereof;
a cap comprising a hollow portion having an internal thread, and a radial pressure application end face at one end,
a retainer having a cylindrical body slidably receivable in the first cylindrical portion comprising two axial segments and means hingedly joining the segments to define lock means therebetween, wherein the segments have a corrugated interior surface for engaging a pipe, a radially outwardly extending flange at one end of the cylindrical body slidably receivable in the cap for engaging the pressure application end face and the end face of the first cylindrical portion of the joint body;
a sealing gasket disposed against the pipe engaging wall of the joint body;
and means disposed on the joint body for engagement with said lock means when the retainer is received in the joint body to prevent rotation of the retainer relative to the joint body.

10. The pipe joint according to claim 9, wherein said retainer is coated with a low-friction material.

11. The pipe joint according to claim 9, wherein said retainer and said gasket are made of an electric insulating material.

* * * * *